United States Patent
Tsai (10) Patent No.: US 11,573,653 B2
(45) Date of Patent: Feb. 7, 2023

(54) TOUCH DISPLAY APPARATUS, DRIVER INTEGRATED CIRCUIT AND TOUCH DISPLAY PANEL

(71) Applicant: Novatek Microelectronics Corp., Hsinchu (TW)

(72) Inventor: Wei-Kang Tsai, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 17/493,865

(22) Filed: Oct. 5, 2021

(65) Prior Publication Data

US 2022/0121302 A1 Apr. 21, 2022

Related U.S. Application Data

(60) Provisional application No. 63/094,359, filed on Oct. 21, 2020.

(51) Int. Cl.
*G06F 3/041* (2006.01)

(52) U.S. Cl.
CPC ........ *G06F 3/0412* (2013.01); *G06F 3/04164* (2019.05); *G06F 3/04166* (2019.05)

(58) Field of Classification Search
None
See application file for complete search history.

(56) References Cited

U.S. PATENT DOCUMENTS

| | | | |
|---|---|---|---|
| 9,665,196 B2 | 5/2017 | Gwon et al. | |
| 9,798,407 B2 | 10/2017 | Lee et al. | |
| 10,775,953 B2 | 9/2020 | Yeh | |
| 2016/0266694 A1* | 9/2016 | Lee | G06F 3/04166 |
| 2016/0364072 A1* | 12/2016 | Chiang | G02F 1/134309 |
| 2017/0060310 A1 | 3/2017 | Gwon et al. | |
| 2018/0329544 A1* | 11/2018 | Yeh | G06F 3/04164 |
| 2019/0073075 A1 | 3/2019 | Cho et al. | |
| 2019/0369773 A1 | 12/2019 | Kimura et al. | |

FOREIGN PATENT DOCUMENTS

| | | |
|---|---|---|
| CN | 106484172 | 3/2017 |
| CN | 108874194 | 11/2018 |
| TW | 201633082 | 9/2016 |
| TW | 201643660 | 12/2016 |

OTHER PUBLICATIONS

"Notice of Allowance of Taiwan Counterpart Application," dated Dec. 6, 2022, p. 1-p. 3, in which the listed reference was/references were cited.

* cited by examiner

*Primary Examiner* — Krishna P Neupane
(74) *Attorney, Agent, or Firm* — JCIPRNET (57) ABSTRACT

The invention provides a touch display apparatus, a driver integrated circuit and a touch display panel. The driver integrated circuit includes a first pad, at least one second pad, a display driving channel, a touch sensing channel, a switching circuit, and a control circuit. The switching circuit is coupled to the display driving channel, the touch sensing channel and the first pad. In a display phase, the switching circuit and the routing circuit are controlled to couple the display driving channel to a data line of the touch display panel via the first pad, and a control signal for controlling the routing circuit is via the at least one second pad. In a touch phase, the switching circuit and the routing circuit are controlled to couple the touch sensing channel to a common electrode of the touch display panel via the first pad.

27 Claims, 5 Drawing Sheets

TOUCH DISPLAY APPARATUS, DRIVER INTEGRATED CIRCUIT AND TOUCH DISPLAY PANEL

CROSS-REFERENCE TO RELATED APPLICATION

This application claims the priority benefit of U.S. application Ser. No. 63/094,359, filed on Oct. 21, 2020. The entirety of the above-mentioned patent application is hereby incorporated by reference herein and made a part of this specification.

BACKGROUND

Technical Field

The invention relates to an electronic apparatus, and particularly relates to a touch display apparatus, a driver integrated circuit and a touch display panel.

Description of Related Art

In-cell touch display panel is widely used in various electronic apparatuses. A mainstream practice of the in-cell touch display panel is to cut a common voltage (VCOM) electrode layer of the display panel into a plurality of common electrodes. These common electrodes may provide a common voltage to a pixel array of the display panel during a display driving operation. In the display driving operation, a display driving channel in a driver integrated circuit may output a plurality of display driving voltages to a plurality of data lines (source lines) of the pixel array through a plurality of display driving pads.

Figure 1:
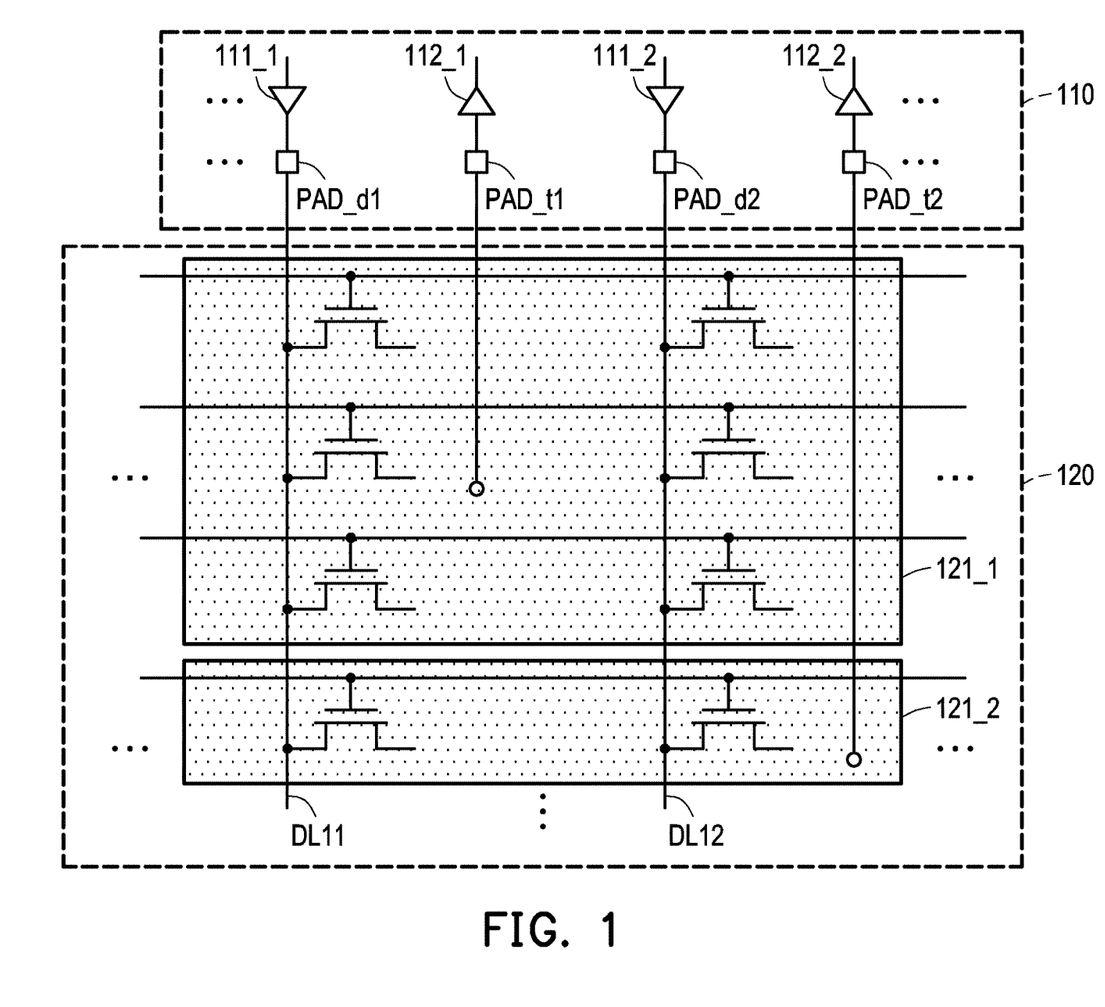
FIG. 1 is a schematic diagram of a touch display apparatus.

FIG. 1 is a schematic diagram of a touch display apparatus. The touch display apparatus shown in FIG. 1 includes a driver integrated circuit 110 and a touch display panel 120. A common voltage electrode layer of the touch display panel 120 is cut into a plurality of common electrodes, such as common electrodes 121_1 and 121_2 shown in FIG. 1. These common electrodes 121_1 and 121_2 may provide a common voltage to the pixel array of the display panel 120 in a display phase (a display driving operation). In the display phase, the display driving channels (such as display driving channels 111_1 and 111_2) in the driver integrated circuit 110 may output a plurality of display driving voltages to a plurality of data lines (source lines, such as data lines DL11 and DL12) of the display panel 120 via a plurality of display driving pads (such as pads PAD_d1 and PAD_d2).

In a touch phase (a touch sensing operation), these common electrodes (such as the common electrodes 121_1 and 121_2) of the display panel 120 are used as sensing pads. In the touch phase, a plurality of touch sensing channels (such as touch sensing channels 112_1 and 112_2) in the driver integrated circuit 110 may sense charge variations of the common electrodes (sensing pads) of the display panel 120 via a plurality of touch sensing pads. For example, the touch sensing channel 112_1 may sense the common electrode 121_1 via the pad PAD_t1, and the touch sensing channel 112_2 may sense the common electrode 121_2 via the pad PAD_t2. Therefore, in addition to the display driving pads PAD_d1 and PAD_d2 used for the display driving operation, the driver integrated circuit 110 must also be equipped with these touch sensing pads PAD_t1 and PAD_t2. The large number of pads will keep the cost of the driver integrated circuit 110 high.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to a touch display apparatus, a driver integrated circuit and a touch display panel to reduce a number of pads of the driver integrated circuit.

In an embodiment of the invention, the driver integrated circuit is adapted to drive a touch display panel. The driver integrated circuit includes a first pad, at least one second pad, a display driving channel, a touch sensing channel, a first switching circuit, and a control circuit. The first pad is adapted to be electrically connected to a routing circuit of the touch display panel. The first switching circuit is coupled to the display driving channel, the touch sensing channel and the first pad. The control circuit is coupled to a control terminal of the first switching circuit and the at least one second pad. In a display phase, the first switching circuit and the routing circuit are controlled to couple the display driving channel to a data line of the touch display panel via the first pad, and a control signal for controlling the routing circuit is via the at least one second pad. In a touch phase, the first switching circuit and the routing circuit are controlled to couple the touch sensing channel to a common electrode of the touch display panel via the first pad.

In an embodiment of the invention, the touch display panel includes a data lines, a common electrode, and a routing circuit. The routing circuit is coupled to the data line and the common electrode. In a display phase, the routing circuit is controlled to couple the data line to a first pad of a driver integrated circuit. In a touch phase, the routing circuit is controlled to couple the common electrode to the first pad of the driver integrated circuit for applying a touch driving signal to the common electrode.

In an embodiment of the invention, the touch display apparatus includes a driver integrated circuit and a touch display panel. The driver integrated circuit includes a first pad, at least one second pad, a display driving channel, a touch sensing channel, a first switching circuit and a control circuit. The first switching circuit is coupled to the display driving channel, the touch sensing channel, and the first pad. The touch display panel includes a data line, a common electrode, and a routing circuit. In a display phase, the first switching circuit and the routing circuit are controlled to couple the display driving channel to the data line via the first pad, and a control signal for controlling the routing circuit is via the at least one second pad. In a touch phase, the first switching circuit and the routing circuit are controlled to couple the touch sensing channel to the common electrode via the first pad.

Based on the above description, the driver integrated circuit and the touch display panel of the invention are configured with a switching circuit and a routing circuit, respectively. Based on the operation of the switching circuit and the routing circuit, the display driving channel of the driver integrated circuit is coupled to the data line of the touch display panel via the first pad during the display phase, and the touch sensing channel of the driver integrated circuit is coupled to the common electrode of the touch display panel via the first pad during the touch phase. The display phase and the touch phase may share the first pad, so that the number of pads of the driver integrated circuit may be effectively reduced.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

A term "couple" used in the full text of the disclosure (including the claims) refers to any direct and indirect connections. For example, if a first device is described to be coupled to a second device, it is interpreted as that the first device is directly coupled to the second device, or the first device is indirectly coupled to the second device through other devices or connection means. "first", "second", etc. mentioned in the specification and the claims are merely used to name discrete components and should not be regarded as limiting the upper or lower bound of the number of the components, nor is it used to define a manufacturing order or setting order of the components. Moreover, wherever possible, components/members/steps using the same referential numbers in the drawings and description refer to the same or like parts. Components/members/steps using the same referential numbers or using the same terms in different embodiments may cross-refer related descriptions.

Figure 2:
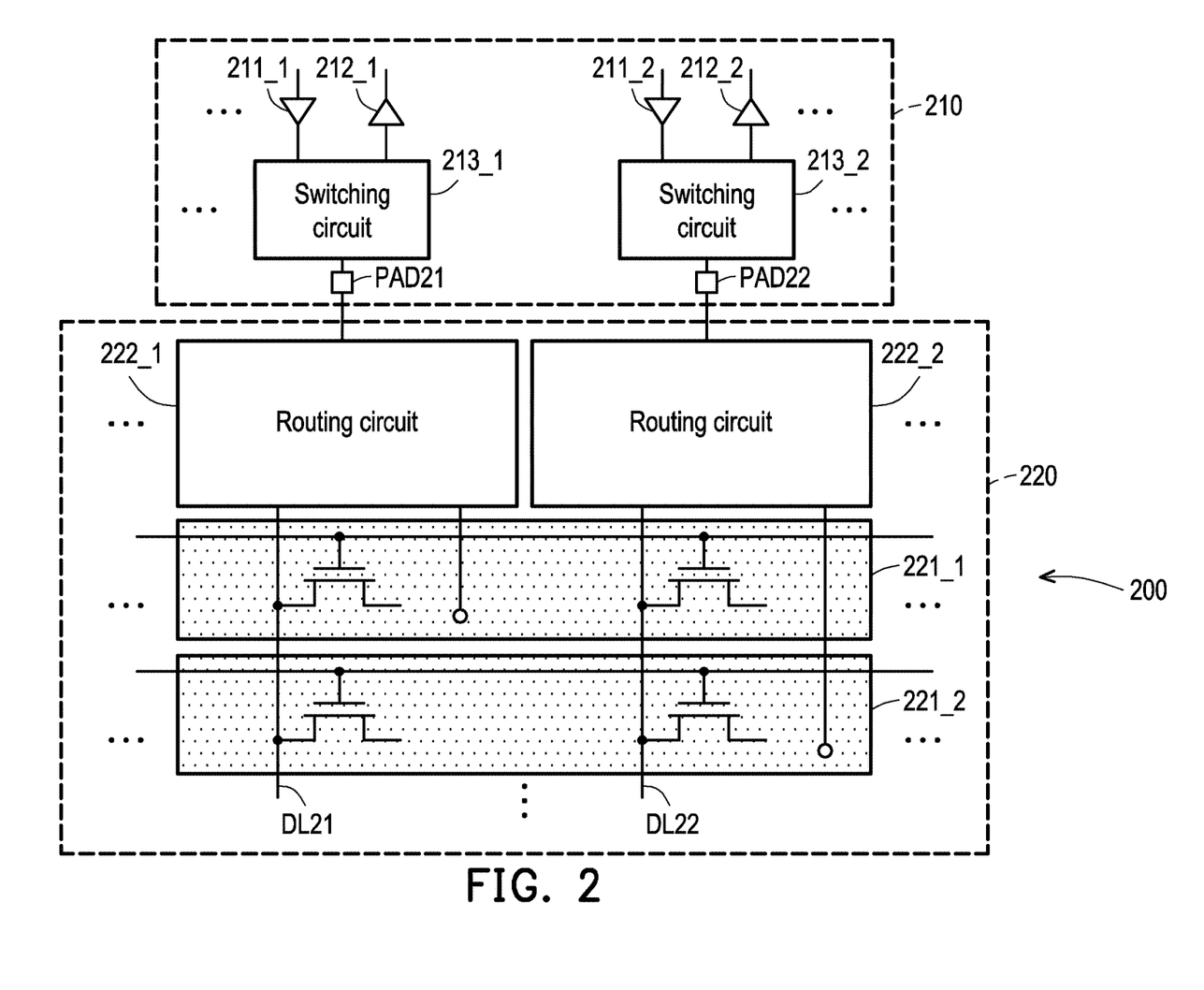
FIG. 2 is a circuit block schematic diagram of a touch display apparatus according to an embodiment of the invention.

FIG. 2 is a circuit block schematic diagram of a touch display apparatus 200 according to an embodiment of the invention. The touch display apparatus 200 shown in FIG. 2 includes a driver integrated circuit 210 and a touch display panel 220. A common voltage electrode layer of the touch display panel 220 is cut into a plurality of common electrodes, such as common electrodes 221_1 and 221_2 shown in FIG. 2. These common electrodes 221_1 and 221_2 may provide a common voltage to a pixel array of the touch display panel 220 in a display phase (a display driving operation). The touch display panel 220 further includes a plurality of data lines (such as DL21 and DL22) and a plurality of routing circuits (such as 222_1 and 222_2). The routing circuit 222_1 is coupled to the data line DL21 and the common electrode 221_1. The routing circuit 222_2 is coupled to the data line DL22 and the common electrode 221_2.

In the display phase, the routing circuit 222_1 is controlled to couple the data line DL21 to the pad PAD21 of the driver integrated circuit 210, and the routing circuit 222_2 is controlled to couple the data line DL22 to the pad PAD22 of the driver integrated circuit 210. Therefore, a plurality of display driving channels in the driver integrated circuit 210 may output a plurality of display driving voltages to a plurality of data lines of the touch display panel 220 through a plurality of pads in the display phase. For example, a display driving channel 211_1 in the driver integrated circuit 210 may output a display driving voltage to the data line DL21 of the touch display panel 220 through a switching circuit 213_1, the pad PAD21 and the routing circuit 222_1, and a display driving channel 211_2 in the driver integrated circuit 210 may output another display driving voltage to the data line DL22 of the touch display panel 220 through a switching circuit 213_2, the pad PAD22 and the routing circuit 222_2.

In a touch phase (a touch sensing operation), the common electrodes (for example, the common electrodes 221_1 and 221_2) of the touch display panel 220 are used as touch sensing electrodes. In the touch phase, the routing circuit 222_1 is controlled to couple the common electrode 221_1 to the pad PAD21 of the driver integrated circuit 210 to apply a touch driving signal to the common electrode 221_1, and the routing circuit 222_2 is controlled to couple the common electrode 221_2 to the pad PAD22 of the driver integrated circuit 210 to apply a touch driving signal to the common electrode 221_2. Namely, the touch sensing channels in the driver integrated circuit 210 may sense charge variations of the common electrodes (touch sensing electrodes) of the touch display panel 220 via the pads in the touch phase. For example, the touch sensing channel 212_1 may sense the common electrode 221_1 via the switching circuit 213_1, the pad PAD21, and the routing circuit 222_1, and the touch sensing channel 212_2 may sense the common electrode 221_2 via the switching circuit 213_2, the pad PAD22, and the routing circuit 222_2. The display phase and the touch phase may share the pads PAD21 and PAD22. Therefore, compared with the driver integrated circuit 110 and the touch display panel 120 shown in FIG. 1, the number of pads between the driver integrated circuit 210 and the touch display panel 220 shown in FIG. 2 may be effectively reduced.

Figure 3:
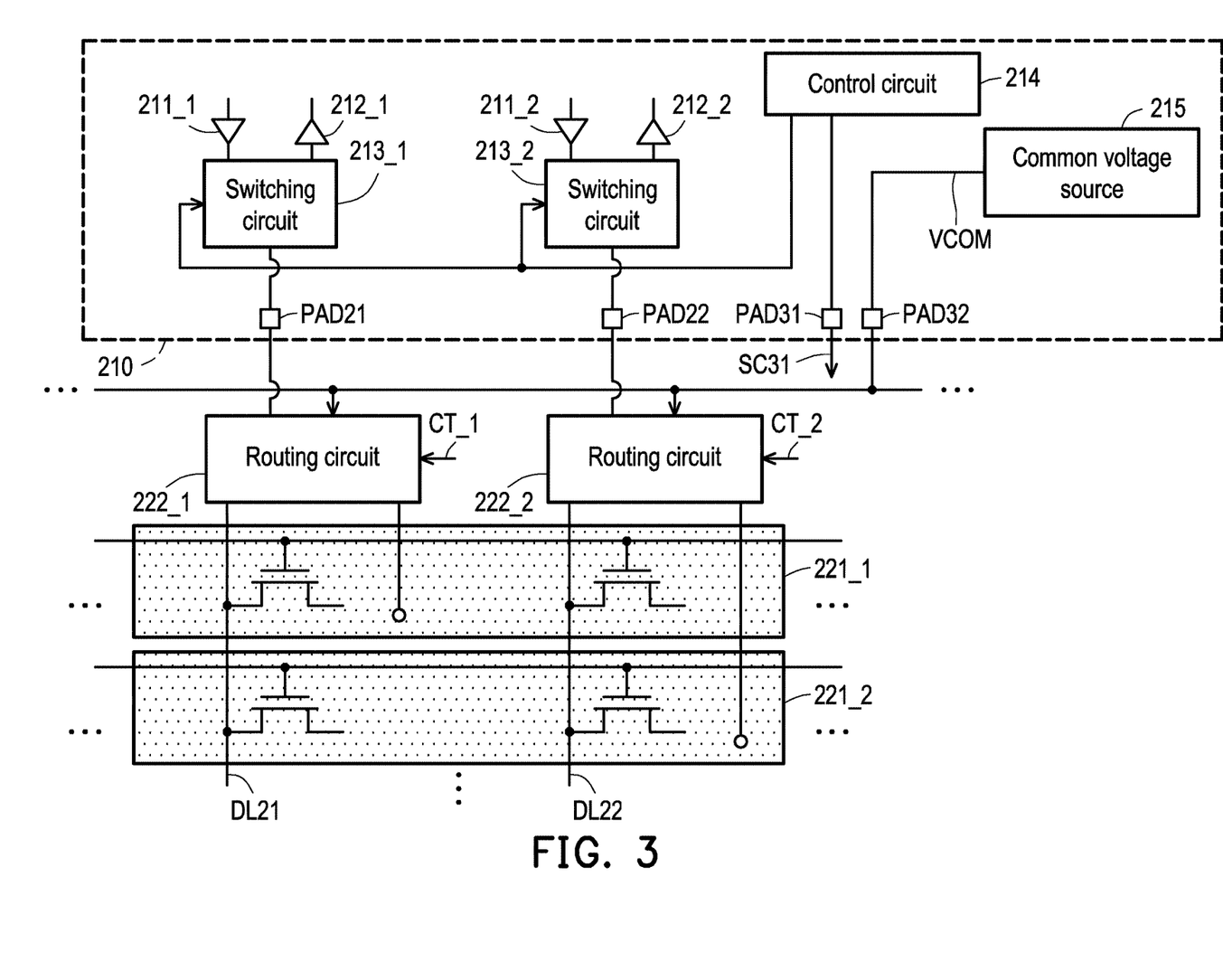
FIG. 3 is a schematic circuit diagram of a driver integrated circuit and a touch display panel shown in FIG. 2 according to an embodiment of the invention.

FIG. 3 is a schematic circuit diagram of the driver integrated circuit 210 and the touch display panel 220 shown in FIG. 2 according to an embodiment of the invention. Referring to FIG. 2 and FIG. 3, the touch display panel 220 includes a plurality of data lines (such as DL21 and DL22), a plurality of common electrodes (such as 221_1 and 221_2), and a plurality of routing circuits (such as 222_1 and 222_2). In the embodiment of FIG. 3, the driver integrated circuit 210 includes a plurality of display driving channels (such as 211_1 and 211_2), a plurality of touch sensing channels (such as 212_1 and 212_2), a plurality of switching circuits (such as 213_1 and 213_2), a plurality of pads (such as PAD21, PAD22, PAD31 and PAD32), a control circuit 214 and a common voltage source 215. The pad PAD21 of the driver integrated circuit 210 is adapted to be electrically connected to the routing circuit 222_1 of the touch display panel 220, and the pad PAD22 of the driver integrated circuit 210 is adapted to be electrically connected to the routing circuit 222_2 of the touch display panel 220.

The switching circuit 213_1 is coupled to the display driving channel 211_1, the touch sensing channel 212_1 and the pad PAD21. The switching circuit 213_2 is coupled to the display driving channel 211_2, the touch sensing channel 212_2 and the pad PAD22. The control circuit 214 is coupled to a control terminal of the switching circuit 213_1, and a control terminal of the switching circuit 213_2. The control circuit 214 is also coupled to at least one control pad PAD31. The control circuit 214 may output the control signal SC31 used for controlling the routing circuits 222_1 and 222_2 to the touch display panel 220 via the at least one control pad PAD31. The routing circuits 222_1 has at least one control terminal CT_1 to receive the control signal SC31. Also, the routing circuits 222_2 has at least one control terminal CT_2 to receive the control signal SC31. The number of the at least one control terminal CT_1 (or CT_2) may correspond to the number of the at least one control pad PAD31.

In the display phase, the routing circuits 222_1 and 222_2 are controlled to couple the pad PAD32 to the common electrodes 221_1 and 221_2. Therefore, a common voltage VCOM of the common voltage source 215 may be provided to the common electrodes 221_1 and 221_2 via the pad PAD32 and the routing circuits 222_1 and 222_2 under control of the control circuit 214 in display phase. In the display phase, the switching circuit 213_1 is controlled to couple the display driving channel 211_1 to the pad PAD21, the routing circuit 222_1 is controlled to couple the pad PAD21 to the data line DL21, the switching circuit 213_2 is controlled to couple the display driving channel 211_2 to the pad PAD22, and the routing circuit 222_2 is controlled to couple the pad PAD22 to the data line DL22. Therefore, in the display phase, the display driving channel 211_1 of the driver integrated circuit 210 can be coupled to the data line DL21 of the touch display panel 220 via the switching circuit 213_1, the pad PAD21 and the routing circuit 222_1 under control of the control circuit 214, and the display driving channel 211_2 of the driver integrated circuit 210 can be coupled to the data line DL22 of the touch display panel 220 via the switching circuit 213_2, the pad PAD22 and the routing circuit 222_2 under control of the control circuit 214. Therefore, the driver integrated circuit 210 may drive the touch display panel 220 to display images.

In the touch phase, under control of the control circuit 214, the data lines DL21 and DL22 are floating by turning off switching paths of the routing circuits 222_1 and 222_2. In the touch phase, the switching circuit 213_1 is controlled to couple the touch sensing channel 212_1 to the pad PAD21, the routing circuit 222_1 is controlled to couple the pad PAD21 to the common electrode 221_1, the switching circuit 213_2 is controlled to couple the touch sensing channel 212_2 to the pad PAD22, and the routing circuit 222_2 is controlled to couple the pad PAD22 to the common electrode 221_2. Therefore, in the touch phase, the touch sensing channel 212_1 of the driver integrated circuit 210 can be coupled to the common electrode 221_1 of the touch display panel 220 via the switching circuit 213_1, the pad PAD21 and the routing circuit 222_1 under control of the control circuit 214, and the touch sensing channel 212_2 of the driver integrated circuit 210 can be coupled to the common electrode 221_2 of the touch display panel 220 via the switching circuit 213_2, the pad PAD22 and the routing circuit 222_2 under control of the control circuit 214. Therefore, the driver integrated circuit 210 may sense a touch event of the touch display panel 220.

In some other embodiments, electrical states of the data lines DL21 and DL22 in the touch phase may be configured according to an actual design. For example, in some other embodiments, a certain signal that has a same phase with that of the touch driving signal generated by the touch sensing channel (such as 212_1 or 212_2) may be used to drive the data lines DL21 and DL22 in the touch phase, and the touch driving signals generated by the touch sensing channels 212_1 and 212_2 are applied to the common electrodes 221_1 and 221_2. In some other embodiments, the routing circuits 222_1 and 222_2 may also be controlled to connect the data lines DL21 and DL22 to the pads PAD21 and PAD22 to receive touch driving signals that are applied to common electrodes 221_1 and 221_2 in the touch phase. For example, the pad PAD21 may be connected to the data line DL21 and the common electrode 221_1 via the routing circuit 222_1 in the touch phase, and the pad PAD22 may be connected to the data line DL22 and the common electrode 221_2 via the routing circuit 222_2 in the touch phase, so that the data lines DL21 and DL22 may also receive the touch driving signals generated by the touch sensing channels 212_1 and 212_2.

Figure 4:
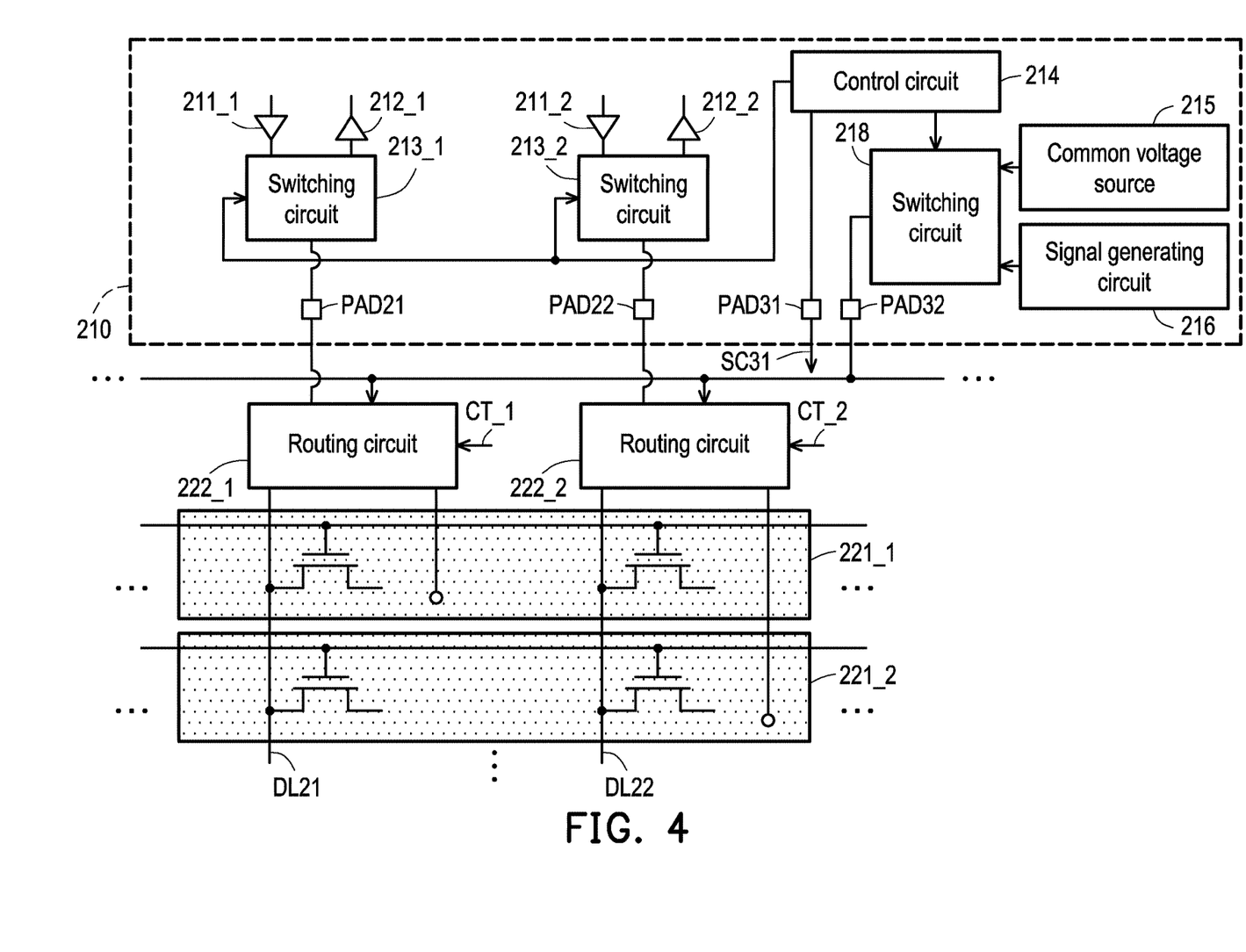
FIG. 4 is a schematic circuit diagram of the driver integrated circuit shown in FIG. 2 according to another embodiment of the invention.

FIG. 4 is a schematic circuit diagram of the driver integrated circuit 210 shown in FIG. 2 according to another embodiment of the invention. Descriptions of the display driving channel 211_1, the display driving channel 211_2, the touch sensing channel 212_1, the touch sensing channel 212_2, the switching circuit 213_1, the switching circuit 213_2, the control circuit 214, the common voltage source 215, the pad PAD21, the pad PAD22, the pad PAD31, the pad PAD32, the routing circuit 222_1, the routing circuit 222_2, the common electrode 221_1, the common electrode 221_2, the data line DL21, and the data line DL22 shown in FIG. 4 may be deduced with reference of the related descriptions of the display driving channel 211_1, the display driving channel 211_2, the touch sensing channel 212_1, the touch sensing channel 212_2, the switching circuit 213_1, the switching circuit 213_2, the control circuit 214, the common voltage source 215, the pad PAD21, the pad PAD22, the pad PAD31, the pad PAD32, the routing circuit 222_1, the routing circuit 222_2, the common electrode 221_1, the common electrode 221_2, the data line DL21, and the data line DL22 shown in FIG. 3, and details thereof are not repeated. In the embodiment of FIG. 4, the driver integrated circuit 210 further includes a signal generating circuit 216 and a switching circuit 218. FIG. 4 differs from FIG. 3 in that the pad PAD32 may output a load free driving signal to the data lines DL21 and DL22 in the touch phase. In this case, the routing circuits 222_1 and 222_2 are configured to couple the data lines DL21 and DL22 to the pad PAD32 instead of the pads PAD21 and PAD22 as that of FIG. 3.

Referring to FIG. 2 and FIG. 4, the signal generating circuit 216 may generate a load free driving signal with a same phase as that of the touch driving signal generated by the touch sensing channel (for example, 212_1 or 212_2). Alternatively, the signal generating circuit 216 may generate the same signal as the touch driving signal generated by the touch sensing channel. In the touch phase, under control of the control circuit 214, the signal generated by the signal generating circuit 216 (the same signal as the touch driving signal of the touch sensing channel) may be used to drive the data lines DL21 and DL22. Under control of the control circuit 214, the signal generating circuit 216 may provide the load free driving signal to the data lines DL21 and DL22 via the routing circuit 222_1 and the routing circuit 222_2 in the touch phase. In the touch phase, the touch driving signals generated by the touch sensing channels 212_1 and 212_2 are provided to the common electrodes 221_1 and 221_2 to sense a touch event of the touch display panel 220.

In detail, the switching circuit 218 is coupled to the common voltage source 215, the signal generating circuit 216, and the pad PAD32. The switching circuit 218 is controlled by the control circuit 214. Under control of the control circuit 214, the signal generating circuit 216 outputs the load free driving signal to the data lines DL21 and DL22 via the switching circuit 218, the pad PAD32, the routing circuit 222_1 and the routing circuit 222_2 in the touch phase. Under control of the control circuit 214, the common voltage source 215 outputs the common voltage VCOM to the common electrodes 221_1 and 221_2 via the switching circuit 218, the pad PAD32, the routing circuit 222_1, and the routing circuit 222_2 in the display phase.

Figure 5:
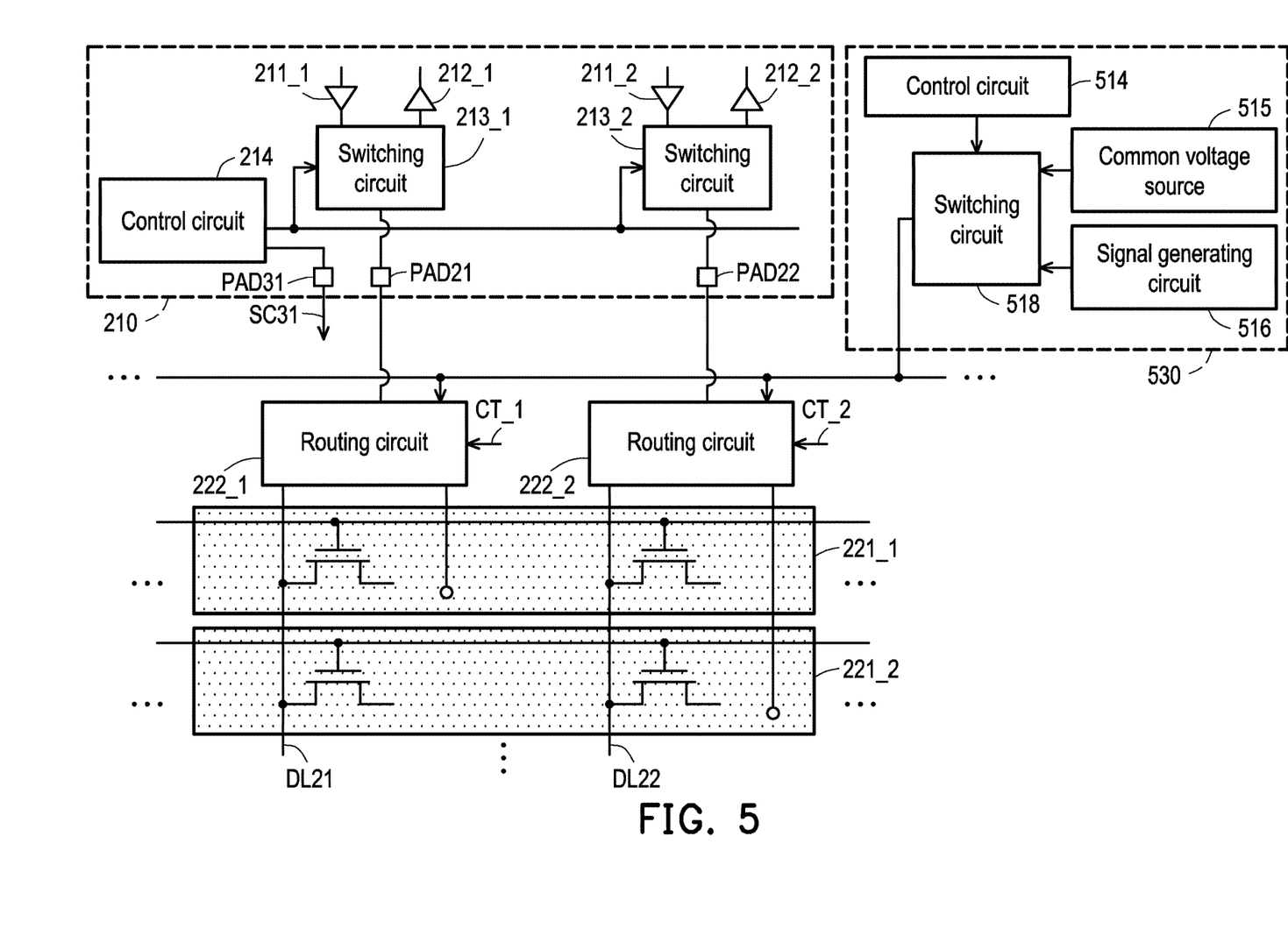
FIG. 5 is a schematic circuit diagram of the driver integrated circuit shown in FIG. 2 according to still another embodiment of the invention.

FIG. 5 is a schematic circuit diagram of the driver integrated circuit 210 shown in FIG. 2 according to still another embodiment of the invention. In the embodiment of FIG. 5, the driver integrated circuit 210 includes the display driving channel 211_1, the display driving channel 211_2, the touch sensing channel 212_1, the touch sensing channel 212_2, the switching circuit 213_1, the switching circuit 213_2, the control circuit 214, the pad PAD21, the PAD22 and the pad PAD31. Descriptions of the display driving channel 211_1, the display driving channel 211_2, the touch sensing channel 212_1, the touch sensing channel 212_2, the switching circuit 213_1, the switching circuit 213_2, the control circuit 214, the pad PAD21, the pad PAD22, the PAD31, the routing circuit 222_1, the routing circuit 222_2, the common electrode 221_1, the common electrode 221_2, the data line DL21, and the data line DL22 shown in FIG. 5 may be deduced with reference of the related descriptions of the display driving channel 211_1, the display driving channel 211_2, the touch sensing channel 212_1, the touch sensing channel 212_2, the switching circuit 213_1, the switching circuit 213_2, the control circuit 214, the pad PAD21, the pad PAD22, the PAD31, the routing circuit 222_1, the routing circuit 222_2, the common electrode 221_1, the common electrode 221_2, the data line DL21, and the data line DL22 shown in FIG. 3 or FIG. 4, and details thereof are not repeated. FIG. 5 differs from FIG. 4 in that common voltage source 515, signal generating circuit 516 and their control and switching circuits are separated from the driver integrated circuit 210.

In the embodiment of FIG. 5, the touch display apparatus 200 further includes a control circuit 514, a common voltage source 515, a signal generating circuit 516, and a switching circuit 518. According to the actual design, the control circuit 514, the common voltage source 515, the signal generating circuit 516, and the switching circuit 518 may be implemented in multiple devices or integrated as a single device. Also, all or part of the devices may be equipped in a printed circuit board (PCB), a flexible board (film) or other circuit boards, or mounted on the touch display panel 220. In the embodiment shown in FIG. 5 (but not limited to this), the control circuit 514, the common voltage source 515, the signal generating circuit 516, and the switching circuit 518 are configured in another integrated circuit 530.

The switching circuit 518 is coupled to the common voltage source 515, the signal generating circuit 516, the routing circuit 222_1, and the routing circuit 222_2. The switching circuit 518 is controlled by the control circuit 514. Under control of the control circuit 514, the load free driving signal of the signal generating circuit 516 is transmitted to the data lines DL21 and DL22 via the switching circuit 518, the routing circuit 222_1 and the routing circuit 222_2 in the touch phase. Under control of the control circuit 514, the common voltage VCOM of the common voltage source 515 is transmitted to the common electrodes 221_1 and 221_2 via the switching circuit 518, the routing circuit 222_1, and the routing circuit 222_2 in the display phase.

In summary, the driver integrated circuit 210 and the touch display panel 220 are configured with switching circuits (for example, 213_1 and 213_2) and routing circuits (for example, 222_1 and 222_2). Based on the operations of the switching circuits 213_1 and 213_2 and the routing circuits 222_1 and 222_2, the display driving channels (such as 211_1 and 211_2) of the driver integrated circuit 210 are coupled to the data lines (such as DL21 and DL22) of the touch display panel 220 via the first pads (such as PAD21 and PAD22) in the display phase, and the touch sensing channels (such as 212_1 and 212_2) of the driver integrated circuit 210 are coupled to the common electrodes (such as, 221_1 and 221_2) of the touch display panel 220 via the first pads (such as PAD21 and PAD22) in the touch phase. The display phase and the touch phase may share the first pads PAD21 and PAD22, so that the number of pads of the driver integrated circuit 210 may be effectively reduced.

According to different design requirements, the blocks of the control circuit 214 and/or the control circuit 514 may be implemented in form of hardware, firmware, software, or combinations thereof. In terms of hardware, the blocks of the control circuit 214 and/or the control circuit 514 may be implemented in a logic circuit on an integrated circuit. Related functions of the above-mentioned control circuit 214 and/or the control circuit 514 may be implemented as hardware by using hardware description languages (for example, Verilog HDL or VHDL) or other suitable programming languages. For example, the related functions of the above-mentioned control circuit 214 and/or the control circuit 514 may be implemented in one or more controllers, microcontrollers, microprocessors, application-specific integrated circuits (ASIC), digital signal processor (DSP), field programmable gate array (FPGA) and/or various logic blocks, modules and circuits in other processing units. In terms of software and/or firmware, the related functions of the control circuit 214 and/or the control circuit 514 may be implemented as programming codes. For example, general programming languages (such as C, C++, or assembly language) or other suitable programming languages are used to implement the control circuit 214 and/or the control circuit 514.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents.

What is claimed is:

1. A driver integrated circuit, adapted to drive a touch display panel, comprising:
   a first pad, adapted to be electrically connected to a routing circuit of the touch display panel;
   at least one second pad;
   a display driving channel;
   a touch sensing channel;
   a first switching circuit, coupled to the display driving channel, the touch sensing channel and the first pad; and
   a control circuit, coupled to a control terminal of the first switching circuit and the at least one second pad, wherein,
   in a display phase, the first switching circuit and the routing circuit are controlled to couple the display driving channel to a data line of the touch display panel via the first pad, and a control signal for controlling the routing circuit is via the at least one second pad, and in a touch phase, the first switching circuit and the routing circuit are controlled to couple the touch sensing channel to a common electrode of the touch display panel via the first pad.

2. The driver integrated circuit according to claim 1, wherein in the display phase, a common voltage source provides a common voltage to the common electrode via the routing circuit.

3. The driver integrated circuit according to claim 2, wherein the common voltage source is comprised in the driver integrated circuit.

4. The driver integrated circuit according to claim 1, wherein in the touch phase, the data line is floated by turning off a switching path of the routing circuit.

5. The driver integrated circuit according to claim 1, wherein in the touch phase, the data line is driven with a signal having a same phase as that of a touch driving signal generated from the touch sensing channel, and the touch driving signal is applied to the common electrode.

6. The driver integrated circuit according to claim 5, wherein in the touch phase, the data line is driven with the same signal as the touch driving signal.

7. The driver integrated circuit according to claim 6, wherein in the touch phase, the first pad is connected to both of the data line and the common electrode via the routing circuit to allow the data line also receiving the touch driving signal.

8. The driver integrated circuit according to claim 1, further comprising:
a signal generating circuit, generating a load free driving signal having a same phase as that of a touch driving signal generated from the touch sensing channel, and providing the load free driving signal to the data line via the routing circuit in the touch phase, wherein the touch driving signal is provided to the common electrode in the touch phase.

9. The driver integrated circuit according to claim 8, further comprising:
a third pad;
a common voltage source, generating a common voltage; and
a second switching circuit, coupled to the common voltage source, the signal generating circuit and the third pad, and controlled by the control circuit, wherein the load free driving signal is output from the signal generating circuit to the data line via the second switching circuit and the third pad in the touch phase, and the common voltage is output from the common voltage source to the common electrode via the second switching circuit and the third pad in the display phase.

10. A touch display panel, comprising:
a data line;
a common electrode; and
a routing circuit, coupled to the data line and the common electrode, wherein
in a display phase, the routing circuit is controlled to couple the data line to a first pad of a driver integrated circuit, and
in a touch phase, the routing circuit is controlled to couple the common electrode to the first pad of the driver integrated circuit for applying a touch driving signal to the common electrode.

11. The touch display panel according to claim 10, wherein in the display phase, a common voltage source provides a common voltage to the common electrode via the routing circuit.

12. The touch display panel according to claim 11, wherein the driver integrated circuit comprises the common voltage source.

13. The touch display panel according to claim 10, wherein in the touch phase, the data line is floated by turning off a switching path of the routing circuit.

14. The touch display panel according to claim 10, wherein in the touch phase, the data line is driven with a signal having a same phase as that of the touch driving signal.

15. The touch display panel according to claim 14, wherein in the touch phase, the data line is driven with the same signal as the touch driving signal.

16. The touch display panel according to claim 15, wherein in the touch phase, the first pad of the driver integrated circuit is connected to both of the data line and the common electrode via the routing circuit to allow the data line also receiving the touch driving signal.

17. The touch display panel according to claim 14, wherein
the signal having the same phase as that of the touch driving signal is output from a signal generating circuit comprised in the driver integrated circuit.

18. A touch display apparatus, comprising:
a driver integrated circuit, comprising a first pad, at least one second pad, a display driving channel, a touch sensing channel, a first switching circuit and a control circuit, wherein the first switching circuit is coupled to the display driving channel, the touch sensing channel, and the first pad; and
a touch display panel, comprising a data line, a common electrode, and a routing circuit, wherein,
in a display phase, the first switching circuit and the routing circuit are controlled to couple the display driving channel to the data line via the first pad, and a control signal for controlling the routing circuit is via the at least one second pad, and
in a touch phase, the first switching circuit and the routing circuit are controlled to couple the touch sensing channel to the common electrode via the first pad.

19. The touch display apparatus according to claim 18, wherein in the display phase, a common voltage source provides a common voltage to the common electrode via the routing circuit.

20. The touch display apparatus according to claim 18, wherein in the touch phase, the data line is floated by turning off a switching path of the routing circuit.

21. The touch display apparatus according to claim 18, wherein in the touch phase, the data line is driven with a signal having a same phase as that of a touch driving signal generated from the touch sensing channel, and the touch driving signal is applied to the common electrode.

22. The touch display apparatus according to claim 21, wherein in the touch phase, the data line is driven with the same signal as the touch driving signal.

23. The touch display apparatus according to claim 22, wherein in the touch phase, the first pad is connected to both of the data line and the common electrode via the routing circuit to allow the data line also receiving the touch driving signal.

24. The touch display apparatus according to claim 18, wherein the driver integrated circuit further comprising:
a signal generating circuit, generating a load free driving signal having a same phase as that of a touch driving signal generated from the touch sensing channel, and providing the load free driving signal to the data line via the routing circuit in the touch phase, wherein the touch driving signal is provided to the common electrode in the touch phase.

25. The touch display apparatus according to claim 24, wherein the driver integrated circuit further comprising:
   a third pad;
   a common voltage source, generating a common voltage; and
   a second switching circuit, coupled to the common voltage source, the signal generating circuit and the third pad, and controlled by the control circuit, wherein the load free driving signal are output from the signal generating circuit to the data line via the second switching circuit and the third pad in the touch phase, and the common voltage are output from the common voltage source to the common electrode via the second switching circuit and the third pad in the display phase.

26. The touch display apparatus according to claim 18, further comprising:
   a signal generating circuit, generating a load free driving signal having a same phase as that of a touch driving signal generated from the touch sensing channel, and providing the load free driving signal to the data line via the routing circuit in the touch phase, wherein the touch driving signal is provided to the common electrode in the touch phase.

27. The touch display apparatus according to claim 26, further comprising:
   a common voltage source, generating a common voltage; and
   a second switching circuit, coupled to the common voltage source, and the signal generating circuit, wherein the load free driving signal are output from the signal generating circuit to the data line via the second switching circuit in the touch phase, and the common voltage are output from the common voltage source to the common electrode via the second switching circuit in the display phase.

* * * * *